United States Patent
Wong

(10) Patent No.: US 8,326,996 B2
(45) Date of Patent: Dec. 4, 2012

(54) METHOD AND APPARATUS FOR ESTABLISHING MULTIPLE SESSIONS BETWEEN A DATABASE AND A MIDDLE-TIER CLIENT

(75) Inventor: Daniel ManHung Wong, Sacramento, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1677 days.

(21) Appl. No.: 11/445,633

(22) Filed: Jun. 2, 2006

(65) Prior Publication Data

US 2007/0283021 A1    Dec. 6, 2007

(51) Int. Cl.
*G06F 15/16* (2006.01)
*G06F 7/00* (2006.01)
(52) U.S. Cl. .................... 709/228; 709/203; 709/229
(58) Field of Classification Search .............. 709/212, 709/227–229; 713/201; 707/102
See application file for complete search history.

(56) References Cited

U.S. PATENT DOCUMENTS

| | | | | |
|---|---|---|---|---|
| 2002/0143958 | A1* | 10/2002 | Montero et al. | 709/228 |
| 2004/0006711 | A1* | 1/2004 | Krishnaswamy et al. | 713/201 |
| 2005/0038801 | A1* | 2/2005 | Colrain et al. | 707/100 |
| 2005/0038828 | A1* | 2/2005 | Kaluskar et al. | 707/200 |
| 2006/0136358 | A1* | 6/2006 | Sonkin et al. | 707/1 |
| 2007/0027896 | A1* | 2/2007 | Newport et al. | 707/102 |
| 2007/0150600 | A1* | 6/2007 | Barsness et al. | 709/227 |

* cited by examiner

*Primary Examiner* — Ian N Moore
*Assistant Examiner* — Thai Nguyen
(74) *Attorney, Agent, or Firm* — Shun Yao; Park, Vaughan, Fleming & Dowler LLP

(57) ABSTRACT

One embodiment of the present invention provides a system for establishing multiple sessions between a database and a middle-tier client. During operation, the system receives a request for a plurality of sessions at a database from a middle-tier client. In response to the request, the system authenticates the middle-tier client, and creates a session between the database and the middle-tier client. The system clones the session one or more times to create the plurality of sessions. Finally, the system sends a plurality of session-handles associated with the plurality of sessions to the middle-tier client. This enables the middle-tier client to distribute the session-handles to end-user clients in response to subsequent requests from the end-user clients to access the database.

17 Claims, 3 Drawing Sheets

METHOD AND APPARATUS FOR ESTABLISHING MULTIPLE SESSIONS BETWEEN A DATABASE AND A MIDDLE-TIER CLIENT

BACKGROUND

1. Field of the Invention

The present invention relates generally to techniques for communicating between computer systems. More specifically, the present invention relates to a method and apparatus for establishing multiple sessions between a database and a middle-tier client.

2. Related Art

Many organizations deploy enterprise applications that adhere to a multi-tier system model. Typically, in a multi-tier system model, a first server processes part of a request from a client and then sends the request to a second server, which either finishes processing the request, or passes the request to yet another server. In general, for interactions between tiers of an enterprise application, a first server authenticates to a second server before sending the request to the second server to ensure that the first server has authorization to send the request to the second server. Often, these authentication operations are responsible for the bulk of the overhead of server-to-server interactions. Therefore, to reduce this overhead, it is desirable for the authentication process to be very fast.

"Login storms" are a common problem related to server-to-server interactions, which typically affects larger organizations. The term "login storm" describes an event wherein many users attempt to login to a system at approximately the same time, which causes the system to slow down. This usually occurs during peak periods, such as at the start of the work-day. Moreover, in some authentication systems, the authentication process involves multiple handshakes to authenticate a system, thus further exacerbating the login storm problem.

Hence, what is needed is a method for establishing a session between two systems without the problems listed above.

SUMMARY

One embodiment of the present invention provides a system for establishing multiple sessions between a database and a middle-tier client. During operation, the system receives a request for a plurality of sessions at a database from a middle-tier client. In response to the request, the system authenticates the middle-tier client, and creates a session between the database and the middle-tier client. The system clones the session one or more times to create the plurality of sessions. Finally, the system sends a plurality of session-handles associated with the plurality of sessions to the middle-tier client. This enables the middle-tier client to distribute the session-handles to end-user clients in response to subsequent requests from the end-user clients to access the database.

In a variation on this embodiment, the system uses a given session from the plurality of sessions to execute a command on the database. This process begins when the system receives a session-handle at the database from the middle-tier client, wherein the middle-tier client received the session-handle from an end-user client, and wherein the session-handle is associated with the given session. The system then verifies a session-key included with the session-handle to determine if the middle-tier client has authorization to use the given session. Next, the system receives the command from the middle-tier client, wherein the middle-tier client received the command from the end-user client. Finally, the system executes the command on the database.

In a variation on this embodiment, the system determines how many sessions to create for the plurality of sessions requested from a user-defined value, or from a number obtained by profiling an organization's use of the database.

In a variation on this embodiment, a given session-handle can include: a connection-handle, which specifies a connection associated with the session; a session-key, which the system uses to determine if the middle-tier client is authorized to use the session; a time-stamp, which specifies when the session-handle was created; and an expiration, which specifies how long the session-handle is valid.

In a variation on this embodiment, the request for the plurality of sessions can occur in response to: reaching a lower threshold for a number of unused session-handles, wherein this lower-threshold can include zero; and receiving a command at the middle-tier client from an end-user client which did not receive a session-handle when there are no remaining unused session-handles.

In a variation on this embodiment, the system creates the session between the database and the middle-tier client by cloning an existing session between the database and the middle-tier client.

In a variation on this embodiment, the system distributes the plurality of sessions over a plurality of connections.

In a variation on this embodiment, cloning the session involves the system cloning a plurality of network and security attributes associated with the session.

DETAILED DESCRIPTION

Figure 1:
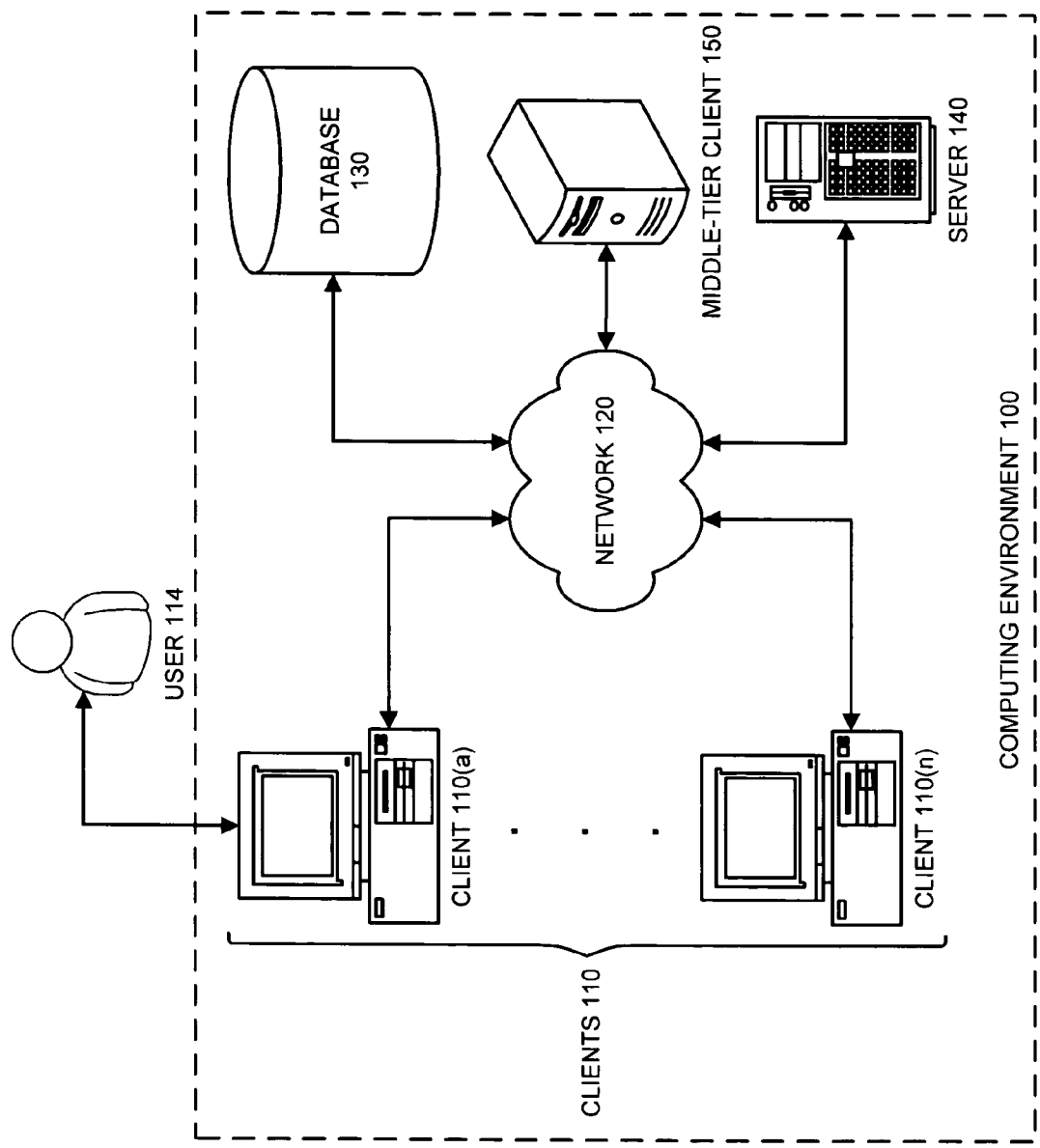
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a non-transitory computer readable storage medium, which may be any device that can store code and/or data for use by a computer system. This includes, but is not limited to, magnetic and optical storage devices such as disk drives, magnetic tape, CDs (compact discs) and DVDs (digital versatile discs or digital video discs).

Overview

One embodiment of the present invention takes advantage of a common application architecture, wherein most applications are running as a single very-powerful application user.

In this embodiment, it is possible to reduce multiple similar login procedures to a single login procedure.

In one embodiment of the present invention, a special login-interface performs a bulk login procedure for a configurable number of sessions between a middle-tier client and a back-end system, such as a database. This special login-interface returns a plurality of session-handles associated with the sessions to the middle-tier client using the login interface. The middle-tier client can then distribute the plurality of session handles to a plurality of end-user clients that need to interact with the backend-system. Note that the plurality of end-user clients can include systems that the middle-tier client trusts, or that have recently authenticated to the middle-tier client.

In one embodiment of the present invention, the special login-interface can distribute the sessions among multiple network connections.

In one embodiment of the present invention, the middle-tier client can distribute the sessions among multiple network connections.

In general, a connection is a communication session that originates and terminates at layer four, the transport layer, of the OSI (Open Systems Interconnection) model.

In general, a session is a communication session that originates and terminates above the transport layer of the OSI model. Often, the session occurs at layer five, the session layer, of the OSI model. Note that a session requires an underlying connection. Also, note that multiple sessions can exist on one connection.

In one embodiment of the present invention, the session-handle comprises a number indicating which session to use on the backend-system. In this embodiment, the backend-system keeps track of which session-handles are associated with which connections. This ensures that each connection only uses sessions that are associated with the connection, thereby preventing unauthorized access to sessions associated with other connections.

In one embodiment of the present invention, the session-handle is a token that includes a session-key. This session-key serves as an authenticator for a client attempting to use the session associated with the session-handle.

In one embodiment of the present invention, a cloning-interface clones an existing session. In this embodiment, creating additional sessions does not require additional authentication.

Computing Environment

FIG. 1 illustrates a computing environment 100 in accordance with an embodiment of the present invention. Computing environment 100 can generally include any type of computer system, including, but not limited to, a computer system based on a microprocessor, a mainframe computer, a digital signal processor, a portable computing device, a personal organizer, a device controller, and a computational engine within an appliance. Computing environment 100 includes clients 110, network 120, database 130, server 140, and middle-tier client 150.

Clients 110 illustrates a plurality of clients. A client can generally include any node on a network including computational capability and including a mechanism for communicating across the network.

Network 120 can generally include any type of wired or wireless communication channel capable of coupling together computing nodes. This includes, but is not limited to, a local area network, a wide area network, or a combination of networks. In one embodiment of the present invention, network 120 includes the Internet.

Database 130 can generally include any type of system for storing data in non-volatile storage. This includes, but is not limited to, systems based upon magnetic, optical, and magneto-optical storage devices, as well as storage devices based on flash memory and/or battery-backed up memory.

Server 140 can generally include any computational node including a mechanism for servicing requests from a client for computational and/or data storage resources.

Middle-tier client 150 can generally include any system that acts as an intermediary between a client, and a server, a database, or a second middle-tier client. Note that middle-tier client 150 can be a client, a server, or a database.

In one embodiment of the present invention, user 114 initiates an e-mail application on client 110(a). In this embodiment, middle-tier client 150 represents an e-mail server responsible for distributing e-mail, and database 130 represents a file system responsible for storing e-mail. Note that clients 10 serve as end-user clients and that database 130 serves as a backend system.

Upon receiving a command to check for new e-mail from user 114, client 110(a) contacts middle-tier client 150 via network 120 and requests user 114's new e-mail. In response to this request, middle-tier client 150 contacts database 130 to establish a plurality of sessions, for example ten sessions, in anticipation of receiving requests to retrieve e-mail from additional clients. After authenticating middle-tier client 150, database 130 creates a session between database 130 and middle-tier client 150. Next, database 130 clones the session to fulfill middle-tier client 150's request for a plurality of sessions, and sends a plurality of session-handles associated with the plurality of sessions to middle-tier client 150. Then, middle-tier client 150 uses one of the sessions from the plurality of sessions on behalf of client 110(a) to retrieve user 114's new e-mail.

In this embodiment, if another client contacts middle-tier client 150 to retrieve e-mail, middle-tier client 150 can use another session from the plurality of sessions on behalf of the client to retrieve the e-mail. Note that the session-handles associated with the plurality of sessions include a session-key, which serves as an authenticator. Thus, middle-tier client 150 can use a session from the plurality of sessions without re-authenticating to database 130, which can greatly improve system performance. Note that, in place of database 130, server 140 can also serve as the backend system.

Requesting a Plurality of Sessions

Figure 2:
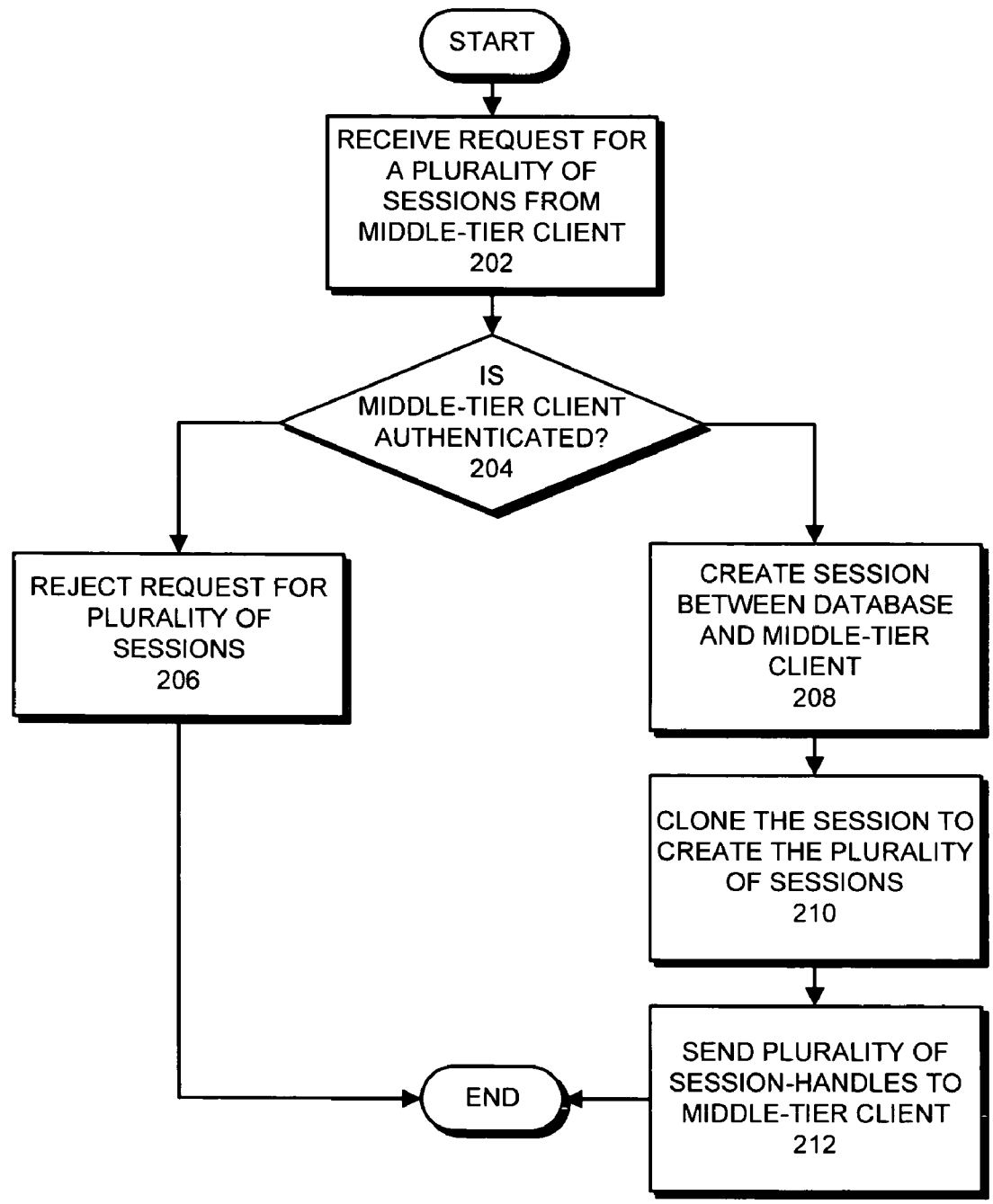
FIG. 2 presents a flowchart illustrating the process of requesting a plurality of sessions in accordance with an embodiment of the present invention.

FIG. 2 presents a flowchart illustrating the process of requesting a plurality of sessions in accordance with an embodiment of the present invention. The process begins when database 130 receives a request for a plurality of sessions from middle-tier client 150 (step 202). In this embodiment, middle-tier client 150 can specify configuration settings for the plurality of sessions, such as time-out length, session life-time, and allocated bandwidth. Note that the request for the plurality of sessions occurs in response to middle-tier client 150 receiving a command from client 110(a) to be executed on database 130, wherein client 110(a) does not have a session-handle, and wherein middle-tier client 150 does not have any session-handles associated with unused sessions.

In one embodiment of the present invention, a session-handle is associated with a session. This session-handle can include a connection-handle associated with a connection, wherein the connection includes the session associated with the session-handle. Additionally, the session-handle can include: a session-key, which database 130 uses to determine if middle-tier client 150 is authorized to use the session; a time-stamp, which specifies when database 130 created the session-handle; and an expiration, which specifies how long the session-handle is valid. Note that the session-key can include a cryptographic key, a certificate, a password, or any other authenticator-type known to those familiar in the art.

In one embodiment of the present invention, the request for the plurality of sessions occurs in response to middle-tier client 150 reaching a lower threshold of a number of unused session-handles. Note that the lower threshold can be zero unused session-handles.

In one embodiment of the present invention, middle-tier client 150 determines the number of sessions to request from database 130 based on a user-defined value, or the result of profiling an organization's use of database 130. Profiling an organization's use of database 130 can involve analyzing the number of users that use database 130 in a given time-period.

After receiving the request from middle-tier client 150 for the plurality of sessions, database 130 authenticates middle-tier client 150 (step 204). Note that authenticating middle-tier client 150 can involve multiple levels of handshaking and complex cryptography, thus database 130 expends significant resources authenticating middle-tier client 150. Therefore, requesting a plurality of sessions instead of a single session can dramatically improve performance by greatly reducing the number of times that database 130 authenticates middle-tier client 150. Furthermore, requesting a plurality of sessions alleviates the login storm problem because middle-tier client 150 does not need to contact database 150 to obtain a session each time a new client performs an action that involves interacting with database 130.

If database 130 fails to authenticate middle-tier client 150, database 130 rejects middle-tier client 150's request for a plurality of sessions (step 206). If database 130 successfully authenticates middle-tier client 150, database 130 creates a session between database 130 and middle-tier client 150 (step 208).

In one embodiment of the present invention, creating a session between database 130 and middle-tier client 150 involves database 130 cloning an existing session between database 130 and middle-tier client 150. In this embodiment, database 130 does not authenticate middle-tier client 150.

In one embodiment of the present invention, database 130 authenticates middle-tier client 150 before cloning an existing session between database 130 and middle-tier client 150.

Next, database 130 clones the session to create the plurality of sessions that middle-tier client 150 requested (step 210). Cloning the session can involve cloning a plurality of network and security attributes associated with the session, such as the session-key. In one embodiment of the present invention, database 130 can distribute the plurality of sessions over a plurality of connections. Note that distributing the plurality of sessions over the plurality of connections can help improve performance, for example by providing increased bandwidth per session.

In one embodiment of the present invention, the session-key is unique to each session. In this embodiment, database 130 creates a new session-key for each cloned session.

Database 130 then sends a plurality of session-handles to middle-tier client 150 enabling middle-tier client 150 to distribute the plurality of session-handles to clients 110 (step 212).

In one embodiment of the present invention, middle-tier client 150 distributes a session-handle to client 110(*a*) upon receiving a request for a session between middle-tier client 150 and database 130.

In one embodiment of the present invention, middle-tier client 150 allocates a session-handle and the corresponding session to client 110(*a*). In this embodiment, middle-tier client 150 does not distribute the session-handle to client 110(*a*). Client 110(*a*) communicates with middle-tier client 150, and middle-tier client 150 then accesses the session associated with the session-handle on client 110(*a*)'s behalf.

Using a Session

Figure 3:
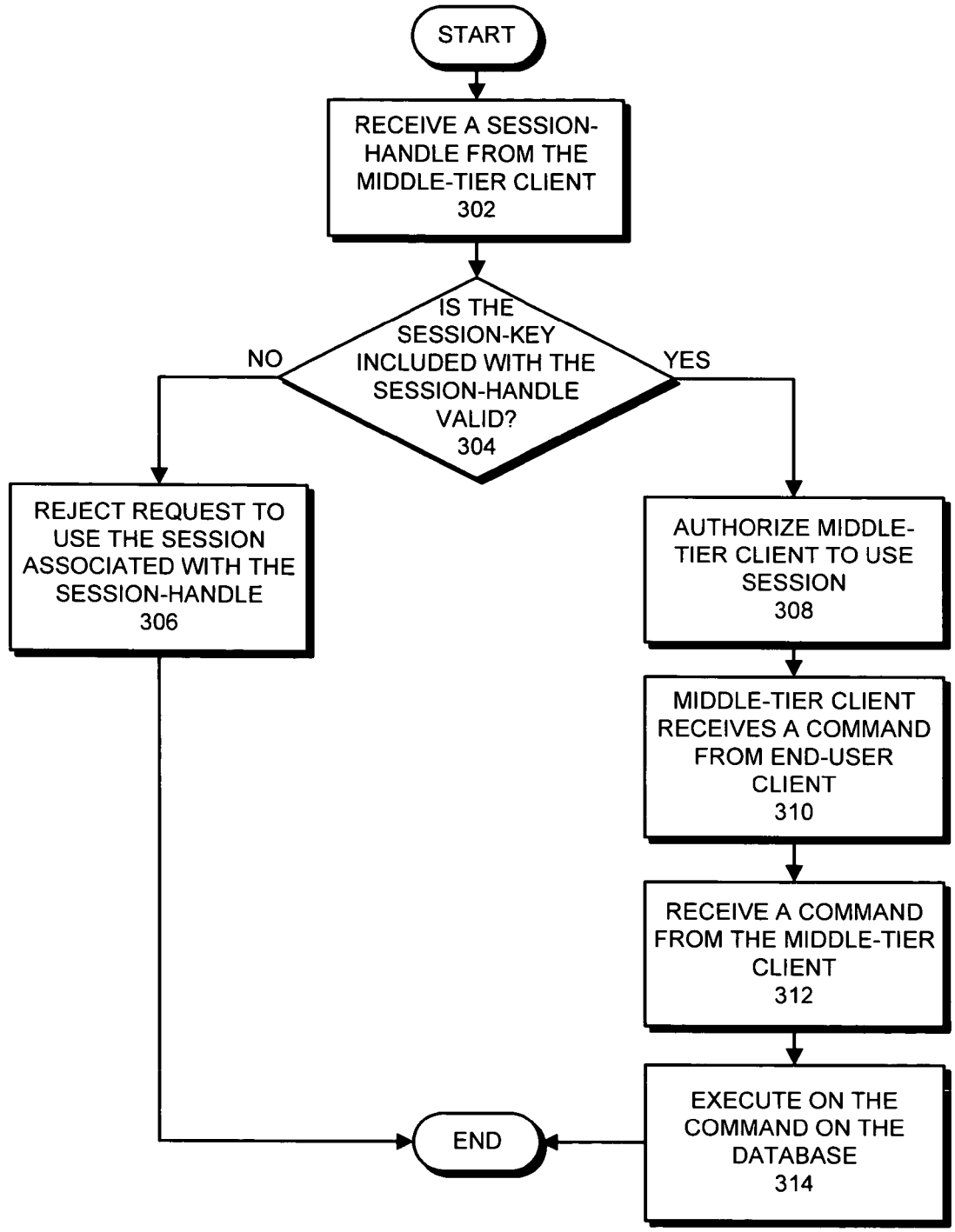
FIG. 3 presents a flowchart illustrating the process of using a session in accordance with an embodiment of the present invention.

FIG. 3 presents a flowchart illustrating the process of using a session in accordance with an embodiment of the present invention. The process begins when database 130 receives a session-handle from middle-tier client 150 (step 302). Note that middle-tier client 150 sends the session-handle to database 130 in response to receiving the session-handle from client 110(*a*).

In one embodiment of the present invention, middle-tier client 150 sends the session-handle to database 130 in response to receiving a command from client 110(*a*). In this embodiment, middle-tier client 150 allocates a session-handle along with an associated session to client 110(*a*) without distributing the session-handle to client 110(*a*).

Next, database 130 determines if a session-key included with the session-handle is valid (step 304).

In one embodiment of the present invention, a session-key is not included with the session-handle. In this embodiment, database 130 tracks how many sessions database 130 assigned to middle-tier client 150 and if the session-handle is associated with an unused session.

On the other hand, if the session-key is not valid, database 130 rejects middle-tier client 150's request to use the session associated with the session-handle that includes the session-key (step 306).

If the session-key is valid, database 130 authorizes middle-tier client 150 to use the session associated with the session-handle that includes the session-key (step 308).

In one embodiment of the present invention, database 130 authorizes client 110(*a*) to use the session associated with the session-handle that includes the session-key.

Next, middle-tier client 150 receives a command from client 110(*a*) (step 310). Then, database 130 receives the command from middle-tier client 150 (step 312). Database 130 then executes the command (step 314).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for establishing multiple sessions between a database and a middle-tier client, the method comprising:
    receiving a single request for a plurality of sessions at a database from a middle-tier client;
    in response to successfully authenticating the middle-tier client, creating a first session between the database and the middle-tier client;
    creating, by the database, other sessions by cloning the first session one or more times;
    sending from the database to the middle-tier client a plurality of session-handles for the first and the other cloned sessions in response to the single request, wherein each session-handle comprises a session-key;
    receiving at the database from the middle-tier client a session-handle selected from the plurality of session-handles by an end-user client, wherein the received session-handle corresponds to a second session;

verifying, at the database, the session-key in the received session-handle to determine that the middle-tier client is authorized to use the second session; and executing, at the database, a command received from the middle-tier client using the second session.

2. The method of claim 1, wherein the number of sessions to create for the plurality of sessions requested is determined by one or more of:
   a user-defined value; and
   a result obtained by profiling an organization's use of the database.

3. The method of claim 1, wherein a given session-handle further comprises one or more of:
   a connection-handle;
   a time-stamp, which specifies when the session-handle is created; and
   an expiration, which specifies how long the session-handle is valid.

4. The method of claim 1, wherein the single request for the plurality of sessions occurs in response to one or more of:
   a lower threshold for a number of unused session-handles being reached, wherein the lower threshold includes zero; and
   a command received at the middle-tier client from the end-user client which does not receive a session-handle when no more unused session-handles exist.

5. The method of claim 1, wherein creating the session between the database and the middle-tier client involves cloning an existing session between the database and the middle-tier client.

6. The method of claim 1, wherein the plurality of sessions are distributed over a plurality of connections.

7. The method of claim 1, wherein cloning the session involves cloning a plurality of network and security attributes associated with the session.

8. A non-transitory computer-readable storage medium storing instructions that when executed by a computer cause the computer to perform a method for establishing multiple sessions between a database and a middle-tier client, the method comprising:
   receiving a single request for a plurality of sessions at a database from a middle-tier client;
   in response to successfully authenticating the middle-tier client, creating a first session between the database and the middle-tier client;
   creating, by the database, other sessions by cloning the first session one or more times;
   sending from the database to the middle-tier client a plurality of session-handles for the first and the other cloned sessions in response to the single request, wherein each session-handle comprises a session-key;
   receiving at the database from the middle-tier client a session-handle selected from the plurality of session-handles by an end-user client, wherein the received session-handle corresponds to a second session;
   verifying, at the database, the session-key in the received session-handle to determine that the middle-tier client is authorized to use the second session; and
   executing, at the database, a command received from the middle-tier client using the second session.

9. The non-transitory computer-readable storage medium of claim 8, wherein the number of sessions to create for the plurality of sessions requested is determined by one or more of:
   a user-defined value; and
   a result obtained by profiling an organization's use of the database.

10. The non-transitory computer-readable storage medium of claim 8, wherein a given session-handle further comprises one or more of:
    a connection-handle;
    a time-stamp, which specifies when the session-handle is created; and
    an expiration, which specifies how long the session-handle is valid.

11. The non-transitory computer-readable storage medium of claim 8, wherein the single request for the plurality of sessions occurs in response to one or more of:
    a lower threshold for a number of unused session-handles being reached, wherein the lower threshold includes zero; and
    a command received at the middle-tier client from the end-user client which does not receive a session-handle when no more unused session-handles exist.

12. The non-transitory computer-readable storage medium of claim 8, wherein creating the session between the database and the middle-tier client involves cloning an existing session between the database and the middle-tier client.

13. The non-transitory computer-readable storage medium of claim 8, wherein the plurality of sessions are distributed over a plurality of connections.

14. The non-transitory computer-readable storage medium of claim 8, wherein cloning the session involves cloning a plurality of network and security attributes associated with the session.

15. An apparatus that establishes multiple sessions between a database and a middle-tier client, comprising:
    a database comprising;
    a receiving mechanism configured to receive a single request for a plurality of sessions at the database from a middle-tier client;
    a creating mechanism configured to create a first session between the database and the middle-tier client in response to successfully authenticating the middle-tier client;
    a cloning mechanism configured to create other sessions by cloning the first session one or more times;
    a sending mechanism configured to send from the database to the middle-tier client a plurality of session-handles for the first and the other cloned sessions in response to the single request, wherein each session-handle comprises a session-key; and
    an executing mechanism configured to:
       receive at the database from the middle-tier client a session-handle selected from the plurality of session-handles by an end-user client, wherein the received session-handle corresponds to the second session;
       verify, at the database, the session-key in the received session-handle to determine that the middle-tier client is authorized to use the second session; and
       execute, at the database, the command received from the middle-tier client using the second session.

16. The apparatus of claim 15, further comprising a requesting mechanism configured to request the plurality of sessions in response to:
    a lower threshold for a number of unused session-handles being reached, wherein the lower threshold can include zero; and
    a command received at the middle-tier client from an end-user client which did not receive a session-handle when there are no remaining unused session-handles.

17. The apparatus of claim 15, further comprising a distribution mechanism configured to distribute the plurality of sessions over a plurality of connections.

* * * * *

UNITED STATES PATENT AND TRADEMARK OFFICE
CERTIFICATE OF CORRECTION

| | |
|---|---|
| PATENT NO. | : 8,326,996 B2 |
| APPLICATION NO. | : 11/445633 |
| DATED | : December 4, 2012 |
| INVENTOR(S) | : Wong |

It is certified that error appears in the above-identified patent and that said Letters Patent is hereby corrected as shown below:

In column 4, line 18, delete "10" and insert -- 110 --, therefor.

In column 8, line 29, in Claim 15, delete "comprising;" and insert -- comprising: --, therefor.

Signed and Sealed this
Twelfth Day of March, 2013

Teresa Stanek Rea
*Acting Director of the United States Patent and Trademark Office*